US006987592B2

(12) United States Patent
Tsukagoshi (10) Patent No.: US 6,987,592 B2
(45) Date of Patent: Jan. 17, 2006

(54) SPATIAL LIGHT MODULATOR AND HOLOGRAPHIC RECORDING/REPRODUCING APPARATUS

(75) Inventor: Takuya Tsukagoshi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/808,434

(22) Filed: Mar. 25, 2004

(65) Prior Publication Data

US 2004/0246556 A1   Dec. 9, 2004

(30) Foreign Application Priority Data

Mar. 27, 2003  (JP)  .................. P. 2003-086896

(51) Int. Cl.
*G03H 1/04*  (2006.01)

(52) U.S. Cl. .................. 359/35; 359/11; 359/238; 359/3

(58) Field of Classification Search ........ 359/238–240, 359/276, 11, 10, 32, 35, 3
See application file for complete search history.

(56) References Cited

U.S. PATENT DOCUMENTS 6,870,650 B2 *  3/2005  Kappel et al. ................. 359/15
2003/0151783 A1 *  8/2003  Shuman .......................... 359/1

FOREIGN PATENT DOCUMENTS

JP             8-314364         11/1996

OTHER PUBLICATIONS

J. Ashley, et al., "Holographic Data Storage", J. Res. Develop., vol. 44, No. 3, May 3, 2000 pp. 341-368.

* cited by examiner

*Primary Examiner*—Fayez G. Assaf
(74) *Attorney, Agent, or Firm*—Oblon, Spivak, McClelland, Maier & Neustadt, P.C.

(57) ABSTRACT

A spatial light modulator (SLM) 101 has a multiplicity of pixels 101a arranged in a lattice form for selecting a transmission state (on) and a blocking state (off) of light on each pixel thereby spatially modulating light intensity. The spatial light modulator 101 has a light transmissivity distribution over whole pixels is set such that a light transmissivity is lower at and around a center and increased with increasing distance from the center.

6 Claims, 6 Drawing Sheets

SPATIAL LIGHT MODULATOR AND HOLOGRAPHIC RECORDING/REPRODUCING APPARATUS

BACKGROUND OF THE INVENTION

The present invention relates to spatial light modulators and holographic recording/reproducing apparatuses, and more particularly to a spatial light modulator and holographic recording/reproducing apparatus capable of suppressing the useless consumption of material sensitivity of a holographic recording medium and preventing against crosstalk.

The holographic recording/reproducing method is known as one method for realizing recording of information with high density. In the usual holographic recording/reproducing method, the signal beam added, two-dimensionally, with data is superposed with a reference beam at within a recording medium. The interference fringe formed is written, to thereby record the information. The data thus recorded on the holographic recording medium can be reproduced by irradiating a reference beam. The reference beam irradiated to the recording medium is diffracted by the grating of interference fringe, thereby causing a reproducing image to be detected and reproducing data. On such a recording medium, the data added on the signal beam can be reproduced at one time by the incidence of a reference beam, thus realizing high-speed reproduction.

The signal beam and reference beam, usually using a laser beam having Gaussian distribution, involves a problem of non-uniformly consuming the material sensitivity. Hence, the laser beam is preferably uniform throughout the beam spot.

JP-A-08-314364 shows a known method of irradiating while scanning a thin beam to an SLM (Spatial Light Modulator). This is equivalent, as the whole SLM, to the irradiation of a laser beam having a uniform intensity distribution within the spot, because the same intensity of beam is irradiated to each pixel of the SLM. Meanwhile, "Holographic data storage" (J. Ashley and ten others, IBM Journal of Research and Development, May 2000, Vol. 44, No. 3, p 348.) also shows a method that the input beam having Gaussiam distribution is reorganized in intensity by using a pair of aspherical optical element to thereby output a uniform intensity of beam within a predetermined area.

However, in the foregoing method of irradiating while scanning a thin beam to the SLM, it takes long time in irradiating the beam throughout the SLM entirety, thus making difficult to realize high-speed recording and reproduction. Meanwhile, in the method of using a pair of non-linear optical element, such an optical element must be provided, increasing the size of the entire optical system. Besides, application is only to a particular intensity distribution, resulting in a fear of insufficient degree of waveform shaping.

SUMMARY OF THE INVENTION

Therefore, it is an object of the present invention to provide a spatial light modulator capable of making the beam intensity distribution uniform by a simple structure and a holographic recording/reproducing apparatus using same.

The foregoing object of the present invention is achieved by a spatial light modulator having a multiplicity of pixels arranged in a lattice form for selecting a transmission or reflection state and a blocking state of light on a pixel-by-pixel basis thereby spatially modulating light intensity, the spatial light modulator characterized in that: light transmissivity distribution or light reflectivity distribution over an entire of the pixels is set such that a light transmissivity or light reflectivity is lower at and around a center of an arrangement of the pixels and increased with increasing distance from the center.

According to the present invention, the light intensity of a beam having Gaussian distribution can be made nearly uniform by a simple structure. Furthermore, such a beam intensity can be spatially modulated. In case a holographic recording/reproducing apparatus with using the spatial light modulator, there is no possibility of non-uniformly consuming the material sensitivity of a holographic recording medium. Meanwhile, crosstalk does not occur at between the pixels where is to be irradiated by a beam center and the around great in intensity. Accordingly, it is possible to provide a holographic recording/reproducing apparatus high in performance.

Preferably, the light transmissivity distribution or light reflectivity distribution is set substantially inversely proportional to Gaussian distribution.

Preferably, it is possible to obtain a beam having an intensity distribution further uniform.

Preferably, the light transmissivity through or light reflectivity upon the pixels is set on a pixel-by-pixel basis.

Further, beam intensity distribution can be made substantially uniform by a simple structure.

The foregoing object of the invention is achieved also by a holographic recording/reproducing apparatus comprising at least: a spatial light modulator having a multiplicity of pixels arranged in a lattice form for selecting a transmission or reflection state and a blocking state of light on each pixel thereby spatially modulating light intensity, light transmissivity distribution or light reflectivity distribution over whole pixels is to be set on each pixel; light-receiving means for detecting an intensity distribution of a light beam passed the spatial light modulator; control means for setting light transmissivity through or light reflectivity upon the pixel, depending upon an intensity distribution of the light beam detected by the light-receiving means.

According to the invention, it is possible to suitably set a light transmissivity distribution or light reflectivity distribution over the entire of the pixels in accordance with a beam intensity distribution. Accordingly, the light transmissivity distribution or light reflectivity distribution on the entire of the pixels can be set such that the beam after passed the spatial light modulator is given uniform in intensity distribution. In addition, such a beam can be spatially modulated. Furthermore, in case a modulated beam is used as a signal beam, there is no possibility of non-uniformly consuming the material sensitivity of a holographic recording medium. Also, no crosstalk occurs at between the pixels where is to be irradiated with a beam center or the around greater in intensity.

Preferably, the light-receiving means comprises a plurality of light-receiving elements distributed in a two-dimensional arrangement, a radial distribution function of the light-receiving elements having a value increasing with increasing distance from a center of the light receiving means.

According to the invention, it is possible to positively detect an intensity distribution of a light beam having Gaussian distribution.

DETAILED DESCRIPTION OF THE PREFERRED EMBODIMENTS

With reference to the drawings, a preferred embodiment of the present invention is explained in detail below.

Figure 1:
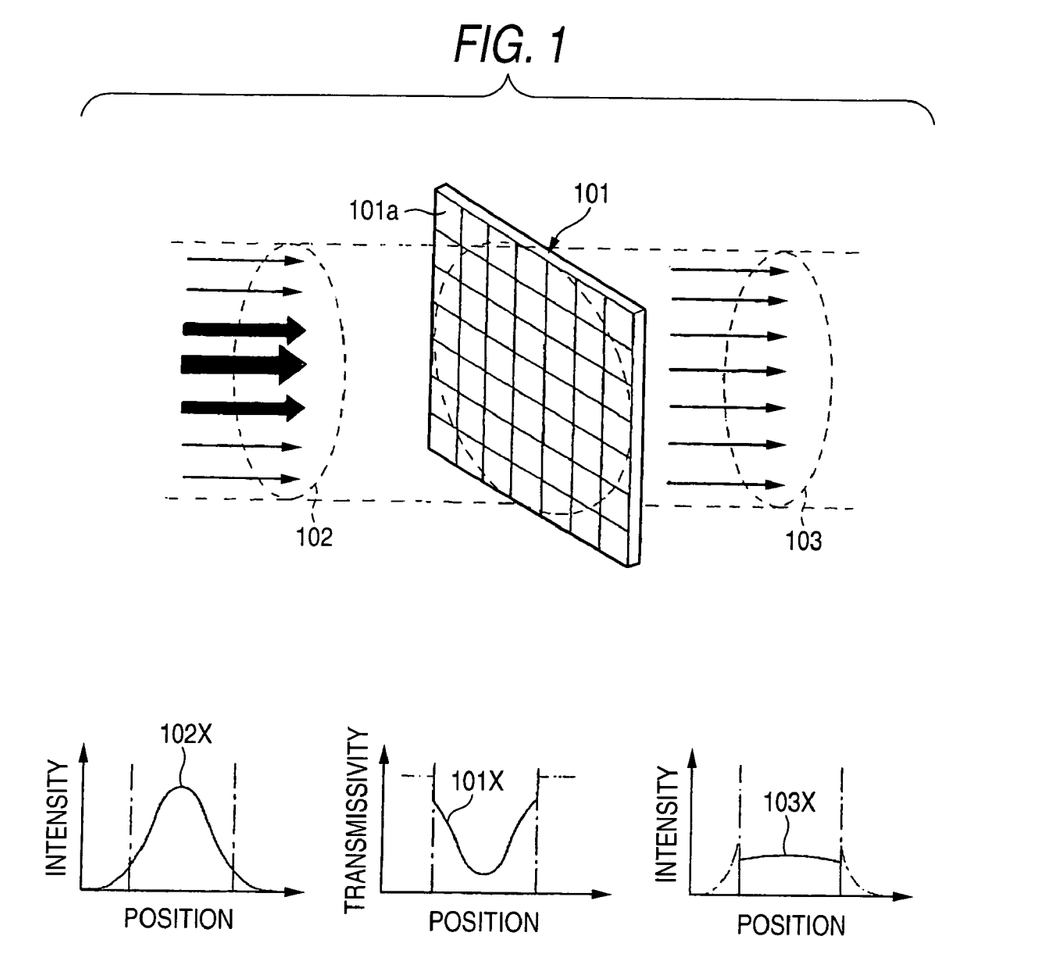
FIG. 1 is a typical view showing an arrangement of a spatial light modulator according to a preferred embodiment of the present invention.

FIG. 1 is a typical view showing a structure of a spatial light modulator according to a preferred embodiment of the present invention.

As shown in FIG. 1, the spatial light modulator (SLM) 101 is a transmission type having a multiplicity of pixels 101a arranged in a lattice form. By selecting a transmission state (on) or a blocking state (off) of light on each pixel, the intensity of a light beam is spatially modulated. The transmission-type spatial light modulator can use a liquid crystal device, for example.

The spatial light modulator 101 has a light transmissivity distribution 101x over the whole pixels such that the light transmissivity is low at and around the center and increased as distant from the center in a manner nearly inversely proportional to the Gaussian distribution 102x given by an intensity distribution of the incident beam 102. Accordingly, in case a light beam having Gaussian distribution enters the spatial light modulator 101 whose pixels are all turned on, the light beam 103 after passed the spatial light modulator 101 is given an intensity distribution 103x nearly uniform.

Figure 2:
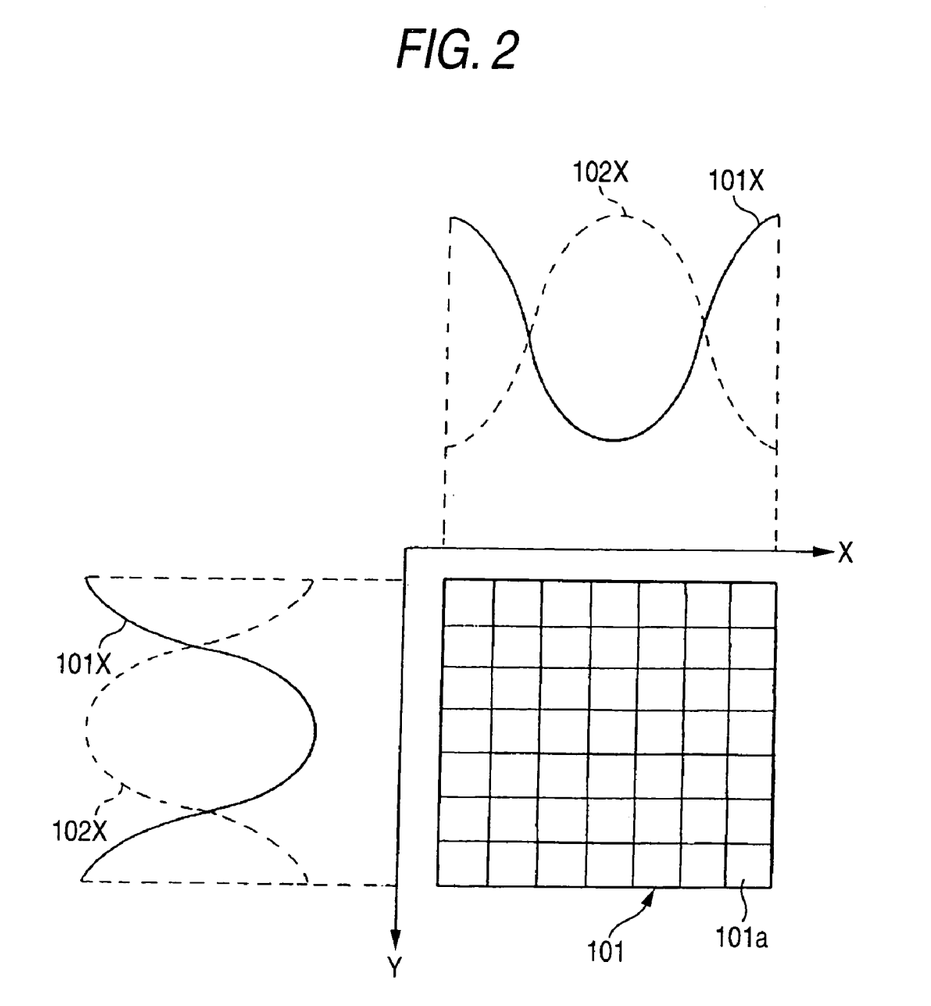
FIG. 2 is a figure showing an example of a light transmissivity distribution of the spatial light modulator.

FIG. 2 is a figure showing an example of a light transmissivity distribution over the spatial light modulator 101.

As shown in FIG. 2, the spatial light modulator 101 is set with a light transmissivity distribution nearly inversely proportional to the Gaussian distribution, in both X and Y directions. For this reason, there is a change in light transmissivity distribution within each one-pixel 101a. Setting of such a light transmissivity distribution can be realized by providing a light transmissive sheet or film having such a light transmissivity distribution on the whole pixels of the spatial light modulator. Otherwise, the light transmissivity distribution may be realized by providing a light transmissive thin film on individual pixel 101a and setting thereon a light transmissivity in accordance with a film thickness or refractive index of the thin film. As in the above, because light transmissivity distribution over the whole pixels of the spatial light modulator 101 is set corresponding to Gaussian distribution, the light beam after passed the spatial light modulator can be made uniform in its intensity distribution.

Figure 3A:
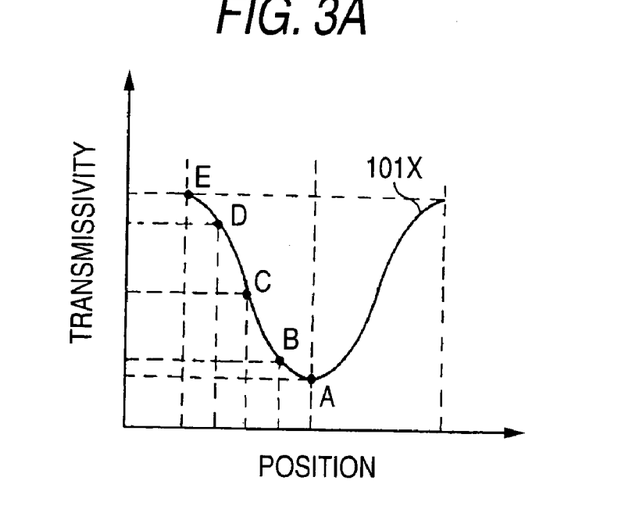
FIGS. 3A and 3B shows another example of a light transmissivity distribution of the spatial light modulator.
Figure 3B:
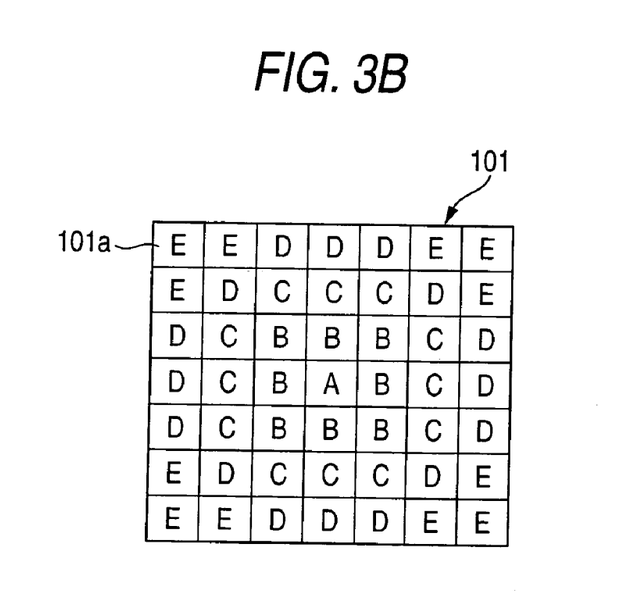

FIGS. 3A and 3B showing another example of a light transmissivity distribution over the spatial light modulator 101.

As shown in FIG. 3A, the light transmissivity on the spatial light modulator 101 is set stepwise based on the pixel, correspondingly to Gaussian distribution. In this embodiment, each pixel 101a is set with a light transmissivity at five levels (A–E), for example. As shown in FIG. 3B, for the spatial light modulator 101 configured by a 7×7 matrix throughout the pixels, the pixel at the center is set with the lowest light transmissivity A. The pixels around that pixel are set with a light transmissivity B, C and D in the order. Furthermore, the remaining peripheral pixels are each set with the highest light transmissivity E. Incidentally, the light transmissivity distribution within one pixel is uniform.

Such a light transmissivity distribution can be set by providing a thickness or refractive index of a film provided on the individual pixel, or realized by attaching a sheet or film having such a light transmissivity distribution over the whole pixels of the spatial light modulator. Even with the light transmissivity distribution as above, the light beam after passed the spatial light modulator can be made nearly uniform in intensity distribution.

Figure 4:
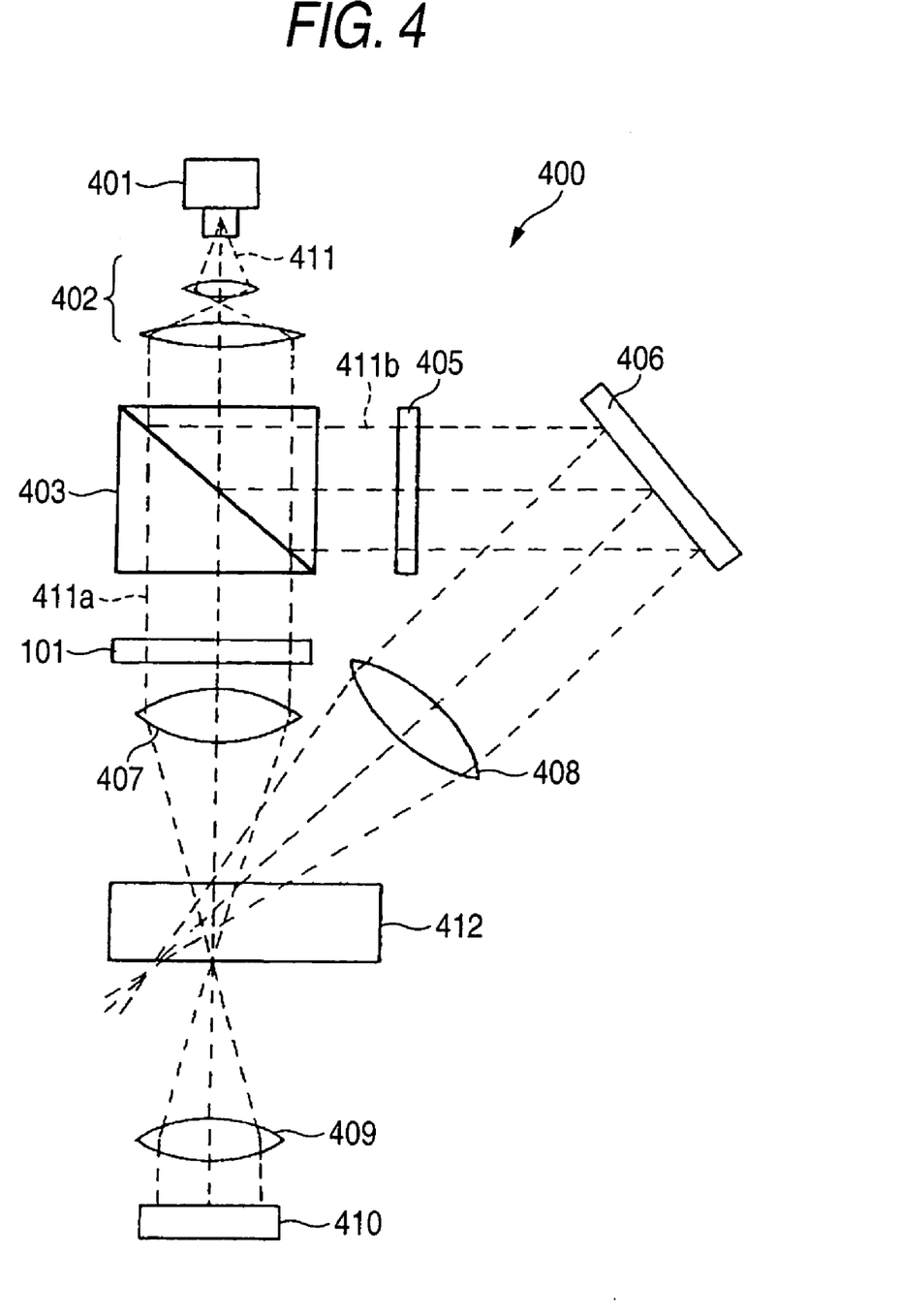
FIG. 4 is a schematic perspective view showing an arrangement of a holographic recording/reproducing apparatus including the spatial light modulator.

FIG. 4 is a schematic perspective view showing one example of a holographic recording/reproducing device including the spatial light modulator 101 as stated above.

As shown in FIG. 4, the holographic recording/reproducing device 400 has, as an optical system for recording and reproduction, a recording/reproducing laser beam source 401 for generating a light beam having a predetermined wavelength including S-polarization and P-polarization light components, a beam expander 402, a polarization beam splitter 403, a spatial light modulator (SLM) 101, a ½-wavelength plate 405, a total reflection mirror 406, Fourier transform lenses 407, 408, a collimator 409, and a CCD image sensor 410.

The recording/reproducing laser beam source 401 generates a light beam having a Gaussian distribution. The light beam 411 is magnified in beam diameter into a collimated light by a beam expander 402, and then entered to the polarization beam splitter 403. The polarization beam splitter 403 allows, of the incident light, the S-polarization component of light to transmit while the P-polarization component of light to reflect thereon, thus splitting same into two light beams 411a, 411b. One light beam 411a, as the S-polarization component, enters the spatial light modulator 101.

The spatial light modulator 101 spatially modulates the intensity of the light beam 411a, to generate a signal beam carried with information. During recording, the pixels on the spatial light modulator 101 are turned on and off depending upon recording data, thereby generating a signal beam in a predetermined pattern. Because the spatial light modulator 101 is set with a light transmissivity on each pixel such that the whole pixels have a light transmissivity distribution inversely proportional to Gausian distribution, the light beam in a state all the pixels are on has an intensity distribution nearly uniform. When predetermined pixels are turned off, a light beam uniform in intensity distribution is spatially modulated. The signal beam exited from the spatial light modulator is focused by a Fourier transform lens 407 and irradiated onto a holographic recording medium 412.

On the other hand, the other light beam 411b, as P-polarization light component, is turned by the ½ wavelength plate 405 into an S-polarization light component similar to the one light beam 411a. Thereafter, the beam is reflected upon the total reflection mirror 406 and passed though a Fourier transform lens 408, thus being irradiated as reference beam onto the holographic recording medium 412. The signal beam and the reference beam are superposed together within a recording layer of the holographic recording medium 412, to thereby form an interference pattern and record a holographic.

During reproduction, all the pixels of the spatial light modulator 101 are turned off to thereby blocking off the transmission of the light beam 411a. Accordingly, the light beam 411 generated by the recording/reproducing laser beam source 401 is irradiated as a reference beam onto the holographic recording medium 412 through the beam expander 402, the polarization beam splitter 403, the ½ wavelength plate 405, the total reflection mirror 406 and the Fourier transform lens 408. The reference beam, modulated by the interference pattern formed within the recording layer, passes the holographic recording medium and irradiated as a reproduced image to the CCD image sensor 410 through the collimator 410.

As explained above, the present embodiment, when recording a holographic, can make uniform the intensity distribution of the signal beam. Accordingly, the material sensitivity of the holographic recording medium is not consumed non-uniform. Also, there is no occurrence of crosstalk at between the pixels where to be irradiated by a beam central region high in intensity. Accordingly, it is possible to provide a holographic recording/reproducing apparatus high in performance.

Incidentally, although the above embodiment explained on the example that uses a light beam having Gaussian distribution as it is, the reference beam may be uniform in its intensity distribution. Nevertheless, where to provide compatibility with the usual holographic recording/reproducing apparatus using a beam having Gaussian distribution as it is, it is preferred to use a light beam having Gaussian distribution with no change.

Figure 5:
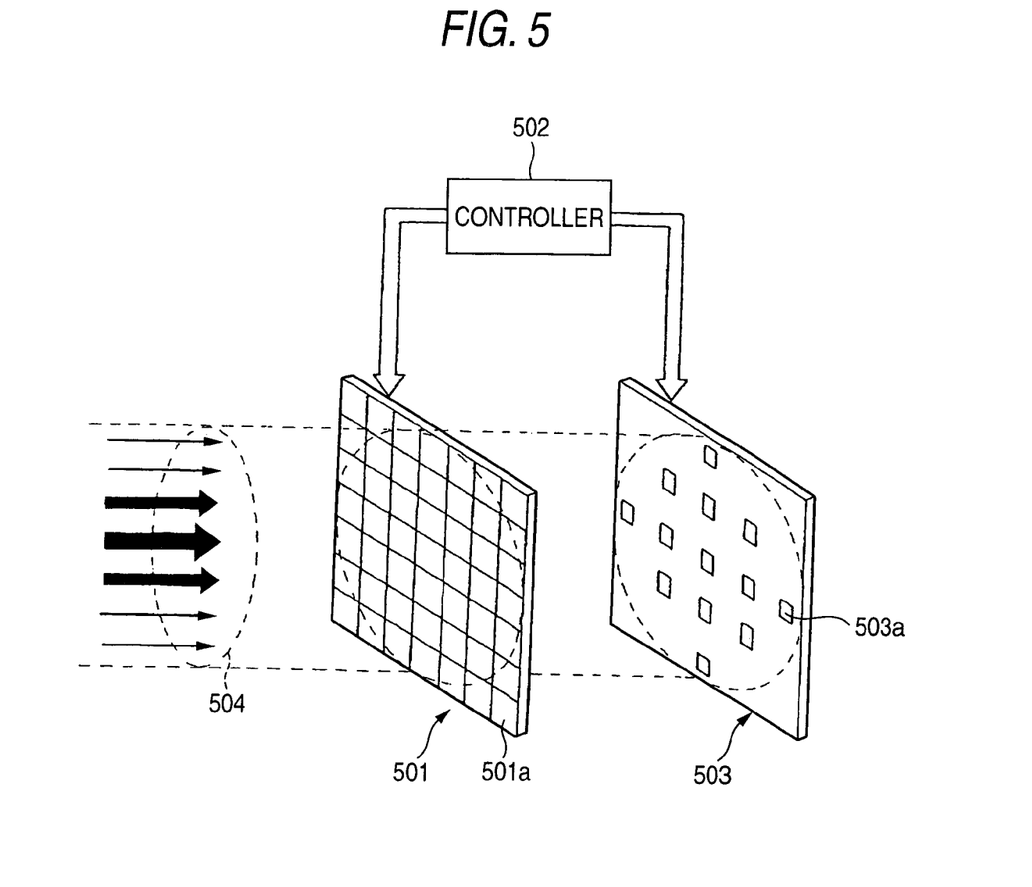
FIG. 5 is a schematic perspective view showing an arrangement of a spatial light modulator according to another preferred embodiment of the invention.

FIG. 5 is a schematic perspective view showing an arrangement of a spatial light modulator according to another preferred embodiment of the invention.

As shown in FIG. 5, the spatial light modulator (SLM) 501 is configured to be arbitrarily set with a light transmissivity of the pixels 501a. Namely, the pixels of the spatial light modulator 501 are controlled not only on-off but also in tonal level by a controller. A ferroelectric liquid-crystal device can be used as such as a spatial light modulator.

The light transmissivity through the pixel of the spatial light modulator 501 is automatically adjusted such that the whole pixels have a light transmissivity distribution inversely proportional to Gaussiam distribution. Automatic adjustment is carried out by receiving the light beam passed the spatial light modulator 501 by a PD checker 503, and setting the tonal level on the pixels to an optimal value by the controller 502 depending upon an output of the PD checker 503. The PD checker 503 is a light-receiving device distributed with a plurality of photodiodes 503a in a two-dimensional form. The intensity of the beam received by the individual photodiode 503a is converted into a voltage value.

The radial distribution function of the photodiodes 503a distributed on the PD checker 503 preferably has an increasing value with increasing distance from the center of the PD checker 503. Namely, provided that the distribution density of the photodiodes 503a distributing within a circular region having a radius r from the center of the PD checker 503 is $D1(r)$, the distribution density of the photodiodes 503a distributing within a circular region having a radius $(r+\Delta r)$ is $D1(r+\Delta r)$, and the distribution density in difference between those is $D(r)=D1(r+\Delta r)-D1(r)$, then $D(r)$ is set greater as the radius r increases. With this structure, it is possible to positively detect a light beam intensity distribution having Gaussian distribution.

During adjustment, a light beam 504 having Gaussian distribution is allowed to enter the spatial light modulator 501 in a state light intensity distribution is unadjusted. The beam after passed the spatial light modulator 501 is irradiated to the PD checker 503 whereby a beam intensity distribution is sought by the PD checker 503. The output of the PD checker 503 is supplied to the controller 502. The controller determines an optimal tonal level on each pixel such that the incident beam is made uniform in its intensity distribution, and sets a control voltage on each pixel required for the tonal level. Meanwhile, the controller controls the light transmissivity through each pixel such that, of a multiplicity of pixels modulated by the spatial light modulator 501, the beams emitted from the pixels of the same signal value are nearly equal in intensity. The control voltage setting to the pixels is held as a data table within the controller 502. Incidentally, the controller 502 may hold at all times, as a standard data table, the control voltage values for elements based on a theoretical beam profile. Depending upon the data table, the light transmissivity of each pixel may be set suitably.

In actual use, when turning on a predetermined pixel of the spatial light modulator 501, the controller 502 supplies a predetermined control voltage corresponding to the relevant pixel depending upon the data table. Accordingly, the spatial light modulator 501 can have a light transmissivity distribution inversely proportional to Gaussiam distribution. As a result, in case a light beam having Gaussian distribution is incident on the spatial light modulator like this, it is possible to obtain a light beam having an intensity distribution nearly uniform as a light beam after passed the spatial light modulator.

Particularly, in the case the beam profile is fixed, if the actual incident beam be deviated in optical axis, uniform beam intensity could not be obtained. Delicate adjustment for uniformity is difficult to perform. However, where light transmissivity distribution can be suitably set as in this embodiment, there is no possibility to cause such a problem. In case a holographic recording/reproducing apparatus is realized by the use of this spatial light modulator, there is no possibility of non-uniformly consuming the material sensitivity of the holographic recording medium. Meanwhile, no crosstalk occurs at between pixels around the center great in intensity.

Incidentally, although this embodiment explained the example on the spatial light modulator structured with a liquid crystal device capable of controlling tonal level, this is not of limitative. Using a spatial light modulator structured with an opening whose opening area is varied by the pixels, the optimal transmissivity can be realized on each pixel by changing the opening area depending upon a control voltage value.

Figure 6:
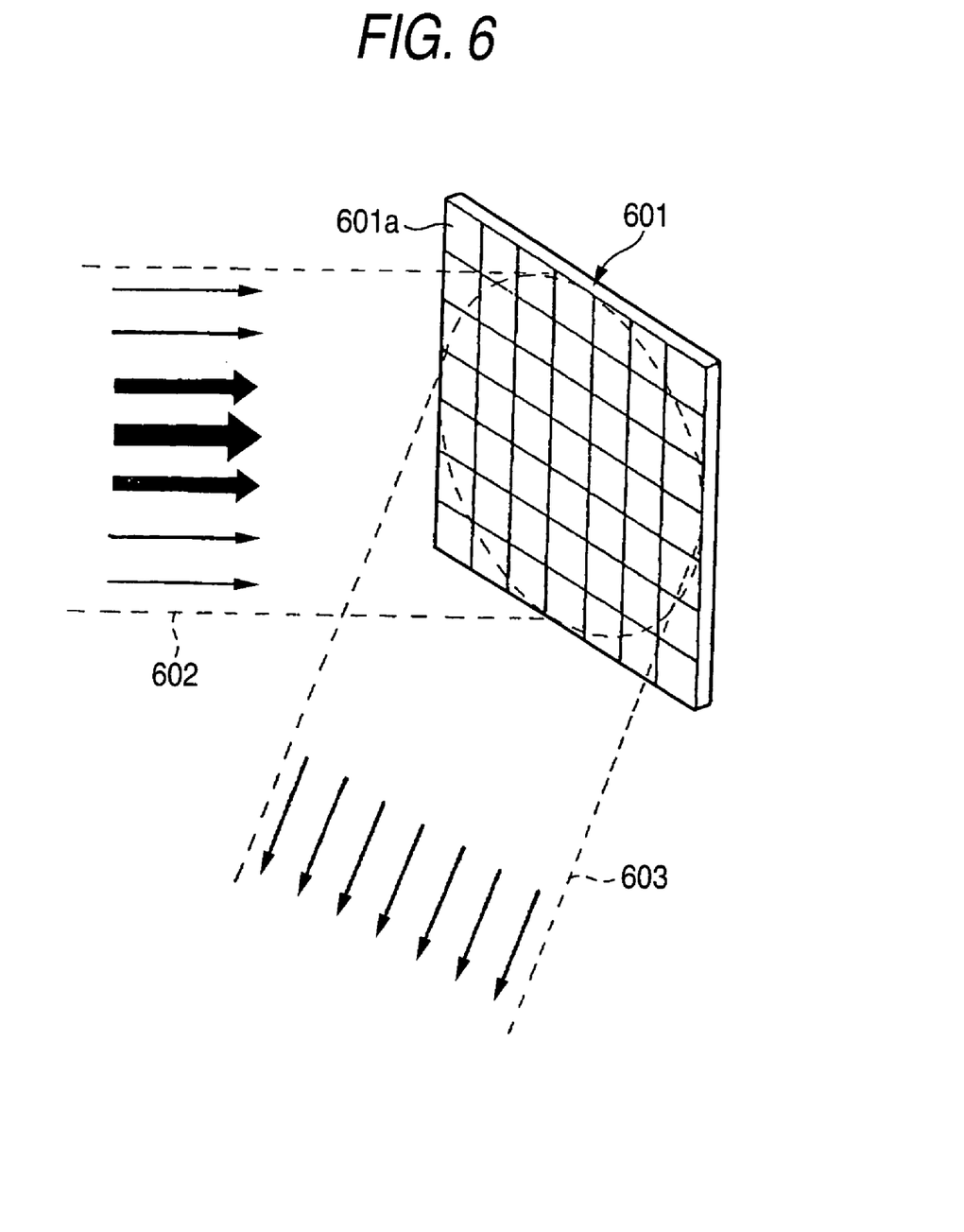
FIG. 6 is a typical view showing an arrangement of a spatial light modulator according to a preferred embodiment of the invention.

FIG. 6 is a typical view showing an arrangement of a spatial light modulator according to a preferred embodiment of the invention.

As shown in FIG. 6, this spatial light modulator (SLM) 601 is of a reflection type having a multiplicity of pixels 601a arranged in a lattice form. By selecting a reflective state (on) and a non-reflective state (off) of light on a pixel-by-pixel basis, the intensity of light beam is modulated in a spatial fashion. Here, non-reflective state refers to a state that no reflection occurs in the same direction as a reflection of a light beam 602 incident on a reflective pixel of a reflective state, e.g. state that the incident beam transmits the pixel, state that is absorbed by the pixel, state that is scattered by the pixel, or state that is reflected in a direction different from a reflecting direction of the light beam entered the pixel of a reflective state. For example, a digital micromirror device (DMD) can be used as the reflective spatial light modulator. Incidentally, in the present description, there are assumably cases that the non-reflective state of light on the reflective spatial light modulator be referred to as "light blocking state".

The spatial light modulator 601 is set with a light reflectivity distribution over the whole pixels such that light reflectivity is lower at and around the center and increased with increasing distance from the center, in a manner nearly inversely proportional to a Gaussian distribution as an intensity distribution of the incident beam 602. Accordingly, in case a light beam having Gaussian distribution enters the spatial light modulator 601 in a state all the pixels are on, the light beam 603 after passed the spatial light modulator 601 an intensity distribution nearly uniform. In the case that a predetermined pixel of the spatial light modulator 601 is off in state, the beam entered the relevant pixel is not to reflect thereupon. Thus, it is possible to carry out spatial modulation into a light beam having an intensity distribution nearly uniform.

Incidentally, the reflectivity distribution on the spatial light modulator 601 may be a distribution of as shown in FIG. 2 or a stepwise distribution as shown in FIG. 3. Meanwhile, the reflective spatial light modulator 601 may not be previously fixed with the beam profile. Namely, the reflective spatial light modulator may be arbitrarily set with a reflectivity on the pixel and be automatically adjusted in the reflectivity distribution over the pixels, as in the transmission spatial light modulator 501 shown in FIG. 5. In this case, a PD checker 503 is arranged in a traveling direction of the reflection light 603 upon the reflective spatial light modulator 601, whose light-receiving result is processed by the controller 502 to thereby set a predetermined control voltage. This places the light reflectivity on the pixel under feedback control, for the spatial light modulator 601.

As explained above, according to the present embodiment, because the signal beam intensity distribution can be made uniform upon recording a holographic, there is no possibility of non-uniformly consuming the material sensitivity of a holographic recording medium. Also, no crosstalk takes place at between the pixels at and around the center where intensity is great. Accordingly, it is possible to provide a holographic recording/reproducing apparatus high in performance.

The present invention is not limited to the foregoing embodiment but can be applied by various modifications within the scope of the invention set forth in the claims. Those are naturally included within the scope of the invention.

For example, the foregoing embodiment was exemplified the spatial light modulator structured with a matrix of seven rows by seven columns, this is not limitative. The pixels may be any in the number, wherein the row and the column must not be equal in the number.

Meanwhile, the optical system of the holographic recording/reproducing apparatus shown in FIG. 4 is a mere one example, the holographic recording/reproducing apparatus may be any in structure provided that the spatial light modulator of the invention is to be used.

Meanwhile, the foregoing embodiment exemplified the case that separately provided are the spatial light modulator 501, the controller 502 and the PD checker 503. This however is not limitative, i.e. the controller 502 and the PD checker 503 may be integral in structure.

As explained above, the present invention can provide a spatial light modulator capable of making the beam intensity distribution uniform by a simple arrangement, and a holographic recording/reproducing apparatus using the same.

What is claimed is:

1. A spatial light modulator comprising:
a multiplicity of pixels arranged in a lattice form and configured to select a transmission or reflection state and a blocking state of a corresponding light ray on each pixel thereby spatially modulating a light intensity of a light beam that includes the corresponding light ray,
wherein a light transmissivity distribution or a light reflectivity distribution over the multiplicity of pixels is set such that a light transmissivity or light reflectivity is lower at and around a center of the lattice of the pixels and increased with an increasing distance from the center of the lattice, and
the light transmissivity distribution or the light reflectivity distribution is achieved by the multiplicity of pixels without changing a direction of light rays within the light beam.

2. A spatial light modulator according to claim 1, wherein the light transmissivity distribution or light reflectivity distribution is set substantially inversely proportional to Gaussian distribution.

3. A spatial light modulator according to claim 1, wherein the light transmissivity through or light reflectivity upon the pixels is set on each pixel.

4. A spatial light modulator according to claim 2, wherein the light transmissivity through or light reflectivity upon the pixels is set on each pixel.

5. A holographic recording/reproducing apparatus comprising:
a spatial light modulator having a multiplicity of pixels arranged in a lattice form and configured to select a transmission or reflection state and a blocking state of a corresponding light ray on each pixel thereby spatially modulating a light intensity of a light beam that includes the corresponding light ray, wherein a light transmissivity distribution or a light reflectivity distribution over the multiplicity of pixels is to be set on each pixel and wherein the light transmissivity distribution or the light reflectivity distribution is achieved by the multiplicity of pixels without changing a direction of light rays within the light beam;
light-receiving means for detecting an intensity distribution of a light beam passed through the spatial light modulator; and
control means for setting the light transmissivity through or the light reflectivity upon a pixel, depending upon an intensity distribution of the light beam detected by the light-receiving means.

6. A holographic recording/reproducing apparatus according to claim 5, wherein the light-receiving means comprises:
a plurality of light-receiving elements distributed in a two-dimensional arrangement, a radial distribution function of the light-receiving elements having a value increasing with an increasing distance from a center of the light receiving means.

* * * * *